(12) United States Patent
Heine

(10) Patent No.: US 6,984,321 B2
(45) Date of Patent: Jan. 10, 2006

(54) APPARATUS FOR FILTERING AND SEPARATING FLOW MEDIA

(75) Inventor: Wilhelm Heine, Hamburg (DE)

(73) Assignee: Rochem RO-Wasserbehandlung GmbH, Hamburg (DE)

( * ) Notice: Subject to any disclaimer, the term of this patent is extended or adjusted under 35 U.S.C. 154(b) by 260 days.

(21) Appl. No.: 10/382,487

(22) Filed: Mar. 6, 2003

(65) Prior Publication Data
US 2004/0154971 A1  Aug. 12, 2004

(30) Foreign Application Priority Data
Feb. 7, 2003  (EP) .................................. 03002815

(51) Int. Cl.
*B01D 63/10* (2006.01)
(52) U.S. Cl. .................... 210/321.85; 210/321.76; 210/650; 210/652; 96/4; 96/10
(58) Field of Classification Search .......... 210/321.76, 210/321.85, 650, 652; 96/4, 10
See application file for complete search history.

(56) References Cited

U.S. PATENT DOCUMENTS
4,872,990 A * 10/1989 Van Wijk .................... 210/644

FOREIGN PATENT DOCUMENTS
EP            0347174 A1 * 12/1989

* cited by examiner

*Primary Examiner*—W. L. Walker
*Assistant Examiner*—K S Menon
(74) *Attorney, Agent, or Firm*—Klaus J. Bach (57) ABSTRACT

In an apparatus for filtering and separating a flow medium by way of membranes disposed in a pressurized housing, which has an inlet for supplying the flow medium to the housing and outlets for discharging the retentate and the permeate from the housing, the membrane structure comprises a central permeate collection and discharge structure to which a plurality of membrane pillows are connected so as to extend therefrom in a spiral pattern and each membrane pillow is in communication with a permeate inlet opening in the permeate collection and discharge structure through which permeate is conducted out of the membrane pillow into the central permeate collection and discharge structure and to the retentate outlet.

15 Claims, 5 Drawing Sheets

APPARATUS FOR FILTERING AND SEPARATING FLOW MEDIA

BACKGROUND OF THE INVENTION

The invention relates to an apparatus for filtering and separating flow media by way of membranes, particularly in accordance with the methods of ultrafiltration, reverse osmosis and nano-filtration, comprising an essentially pressure-tight housing in which the membranes are arranged and which includes an inlet for admitting the flow medium to be separated into the housing and outlets for discharging the permeate and the retentate from the housing.

Such an apparatus is known for example from EP-8-0289740. In this apparatus, the medium to be separated is conducted over a stack of individual membrane elements past which the medium flows via flow passages between the membrane elements, which are supported in spaced relationship by spacer elements on which the membranes are supported. The membrane elements are in the form of so-called membrane pillows and the flow medium flows past the stacked membrane pillows in a meander-like flow pattern from the inlet of the apparatus to the outlet.

The permeate itself is collected in the interior of the membrane pillows, is conducted to a central permeate discharge opening of the permeate pillow and from there is discharged by way of a permeate collection pipe extending through the apparatus.

Because of the meander-like flow path for the flow medium around the individual membrane elements from the inlet of the apparatus to its outlet, through which the flow medium leaves the apparatus in a concentrated state that is as a retentate, there is a substantial pressure loss from the inlet to the outlet, which pressure loss is larger, the larger the number of membranes stacked on top of one another in the apparatus. Such apparatus can generally only be operated reasonably if sufficient energy is available to sufficiently pressurize the flow medium to be separated upon entering the apparatus. The operation of such apparatus, which as regards their separating function have been quite effective during practical use, consumes therefore a large amount of energy. Although it is possible theoretically to improve the output of such apparatus by increasing the number of membrane elements per apparatus, this also increases the energy requirements of the apparatus because of the principle explained above.

It has been tried to reduce the energy consumption of such apparatus while maintaining the same membrane surface area by not conducting the flow medium through the apparatus in a meander-like flow pattern from the inlet to the outlet but conduct the flow medium in a parallel flow pattern past membrane elements arranged one after the other, that is, by providing a flow path which is essentially linear with the membrane elements oriented in the flow direction. A typical example of such an apparatus is described in EP-B-0 707 884.

When there was a need for increased performance also in this case, an additional set of membrane elements was installed in the apparatus essentially linearly with the flow direction. With this increase of the effective membrane surface in the apparatus a modular-like extension of the apparatus could be provided in a basically elegant manner.

This apparatus is different from the first-mentioned apparatus in that it actually had substantially lower energy requirements for the same separating performance than the first mentioned apparatus.

However, both types of apparatus are limited with respect to the total available membrane surface area that can be accommodated by the apparatus because of their respective designs which permits accommodation of only a limited amount of membrane elements.

For certain applications of such apparatus, for example, in commercial and military ships and boats, there is, on one hand, a need for low energy requirements of such apparatus and, on the other hand, for high efficiency, that is, a high separation performance in combination with low space requirements.

It is therefore the object of the present invention to provide an apparatus in which the advantages of the two types of apparatus are combined. It should accommodate a large membrane area and have a relatively low hydraulic resistance for the flow medium passing through the apparatus and it should be simple in design so that its construction costs are low.

It should furthermore be easy to replace present apparatus of the type referred to above by the new apparatus without the need of increased space and it should have an improved separation performance.

SUMMARY OF THE INVENTION

In an apparatus for filtering and separating a flow medium by way of membranes disposed in a pressurized housing, which has an inlet for supplying the flow medium to the housing and outlets for discharging the retentate and the permeate from the housing, the membrane arrangement comprises a central permeate collection and discharge structure to which a plurality of membrane pillows are connected so as to extend therefrom in a spiral pattern and each membrane pillow is in communication with a permeate inlet opening in the permeate collection and discharge structure through which permeate is conducted out of the membrane pillow into the central permeate collection and discharge structure to the permeate outlet.

The apparatus according to the invention provides for the advantages of a linear flow of the flow medium through the apparatus and past the membrane elements arranged therein and also for the advantages of the apparatus with the meander-like flow pattern of the stacked membrane elements.

With the arrangement according to the invention, furthermore a quasi- "open" channel is provided for the flow medium from the inlet to the outlet and it can accommodate membranes with more than four times the membrane surface area than the prior art apparatus with the same outer dimensions.

The arrangement according to the invention also is of simple design as it requires no design features for mechanically positioning and the stabilizing the membrane pillows since, with the multi-element or, respectively, multi-layer spiral arrangement of membrane elements, which is obtained by winding the membrane pillows onto the tubular center post which extends through the apparatus and forms the permeate discharge structure, that is, by the curvature of the membrane pillows achieved thereby, the membrane arrangement becomes very stable. The length of the individual membrane pillows is determined only by the length of the apparatus, that is, by the housing, in which the membrane pillows are contained in a spiral-like fashion. The radial thickness of the multi-element spiral structure is determined by the number of membrane pillows, which form the multi-element spiral, and by the width of the individual membrane pillows.

The flow medium to be separated in the apparatus can flow from the inlet to the outlet transverse to the multi-element spiral at the same time between the membrane pillows—like in an open channel arrangement while flowing along both sides of the membrane pillow.

An individual membrane pillow has a rectangular shape. A permeate outlet opening is provided along one end thereof. The provision of the outlet at one end is advantageous when compared with the known membrane pillows where the permeate outlet opening is a circular opening formed in a side surface area of the membrane pillow, which must be formed after completion of the membrane pillow in a separate step. Known membrane pillows of the this type sometimes include a plurality of permeate discharge openings which are oriented transverse to the membrane surface. The membrane pillow according to the invention is closed only at three sides by welding and/or cementing of the individual membrane elements forming the membrane pillow.

It is possible to construct the apparatus in such a way that it includes at least one set of membrane pillows, which form the multi-channel spiral described earlier. But it is possible also to arrange in the apparatus a plurality of separate sets of membrane pillows linearly behind one another in series so as to form a separate multi-element spiral as described earlier. With such a modified arrangement different derivatives can be collected out of the medium to be separated when the medium flows through the apparatus depending on the selected type of membrane elements forming the respective sets of the multi-layer spirals.

In order to ensure as much as possible a uniform distance between the individual membrane pillows forming the multi-element spiral, so as to provide for linear flow channels through the apparatus, multi-element second spiral-like spacer elements are arranged between adjacent multi-element membrane pillows whereby the adjacent membrane elements are maintained in spaced relationship. Even if, after the completion of the spiral and the mounting thereof in their proper positions, the individual membrane pillows are supported tightly together the spacer elements disposed between the membrane elements still provide for an open flow channel for the medium to be separated.

The spacer elements have preferably a lattice-like structure so that the spacer elements have only little contact with the adjacent membrane elements. In this way, it is made sure that the spacer elements form only a negligible flow resistance for the flow medium.

The lattice-like structure of the spacer elements is formed preferably by a plurality of essentially rectangularly intersecting rod-like first and second elements, wherein the first elements have a larger cross-section than the second elements and extend between the membrane pillows essentially parallel to the flow direction of the medium to be separated. The second elements with the smaller cross-section extend then normal to the flow direction so that the medium to be separated can pass between the surfaces of adjacent membrane elements and the second elements.

In order to keep the flow resistance of the spacer elements between the membrane elements as low as possible they have an essentially circular cross-section. The spacer element itself may be formed as a one-piece part from an elastic or elastomer material so that it is inexpensive and simple to manufacture and easily adapts to the wound-up membrane elements of the multi-element spiral.

In the interior of the membrane pillows, there is preferably provided between the membranes forming the membrane pillow at least one support element, which not only stabilizes the membrane pillow but also has a drainage function, that is, which facilitates the flow of the permeate that has entered the membrane pillow to the permeate discharge openings of the membrane pillow.

In order to facilitate the collection of the permeate in the membrane pillow, it is advantageous if the support element is a fleece-like structure so that the permeate can flow not only along the opposite side surfaces of the support element but through the support element itself.

In order to maintain the spiral consisting of a plurality of membrane pillows and a plurality of spacer elements which, when being wound up form a circular structure, it is advantageous to wind strings around the structure. A single string may be used which is wound coil-like onto the finished circular spiral element structure. But it is also possible to use a plurality of string-like elements which each extends around a part of the spiral element structure.

Preferably, the string element is soaked with a curable resin or plastic material, or is coated therewith, so that, after being wound around the spiral element structure, the string structure enclosing the circular body hardens. In this way, the spiral element structure is fixed after completion in its design shape and the membrane pillows and spacer elements and inner support elements are prevented from being uncoiled to the essentially flat original shape by the innate spring-back forces.

In accordance with another advantageous embodiment of the invention, the multi-element spirals (of membrane elements and spacer elements and the membrane support elements) are provided with closure elements, which delimit the spiral or spirals and the permeate discharge as well as the permeate collection structure in a pressure-tight manner and which are provided with at least one inlet for the medium to be separated and at least one outlet for the retentate and for the permeate. The discharge elements form, together with the housing, a pressure-tight closed interior space of the apparatus through which the flow medium to be separated flows from the inlet to the outlet linearly over both sides of the spirally wound-up membrane pillows.

In the apparatus, the spirals, the permeate collection and discharge structure, and the discharge elements form a separation unit, which can be inserted into the housing and removed therefrom. It is ensured in this way that the separation unit can be easily serviced and examined by removal from the housing for which purpose only one of the closure elements delimiting the separation unit at opposite sides thereof must be removed. In this apparatus design, the separation unit can therefore easily be replaced.

In order to facilitate pre-assembly of the separation unit and also to permit removal of the separation unit from the apparatus when a membrane pillow becomes defective and replacement by an operative separation unit becomes necessary, without the need for removal of the rod-like permeate collection and discharge structure which extends axially through the apparatus, it is advantageous to wind the multi-element spiral onto a separate tube element in which the permeate collection and discharge structure is received. The separation unit designed in this way only needs to be moved over the tube-like permeate discharge and collection structure or pulled off therefrom. Expediently, the tube element consists of a plastic material whereby the manufacturing costs are low as compared with a metallic tube element. With a suitable selection of the plastic material for the tube element, a seal will also be provided between the inner surface of the tube element and the permeate inlet openings of the permeate discharge and collection structure. Permeate flow passages may be formed by an axial groove or plurality of axial grooves spaced around the surface of the permeate discharge and collection structure.

In order to permit with this arrangement, the permeate flowing out of the permeate discharge openings of the membrane pillows by way of the tube element to enter the permeate inlet opening of the permeate discharge and collection structure, the tube element includes expediently a plurality of radial openings, which are in communication at one side with the permeate discharge openings of the membrane pillows and, on the other side with the permeate inlet openings of the permeate discharge and collection structure.

An embodiment of the invention will be described below in greater detail on the basis of the accompanying schematic drawings.

DESCRIPTION OF A PREFERRED EMBODIMENT

Figure 1:
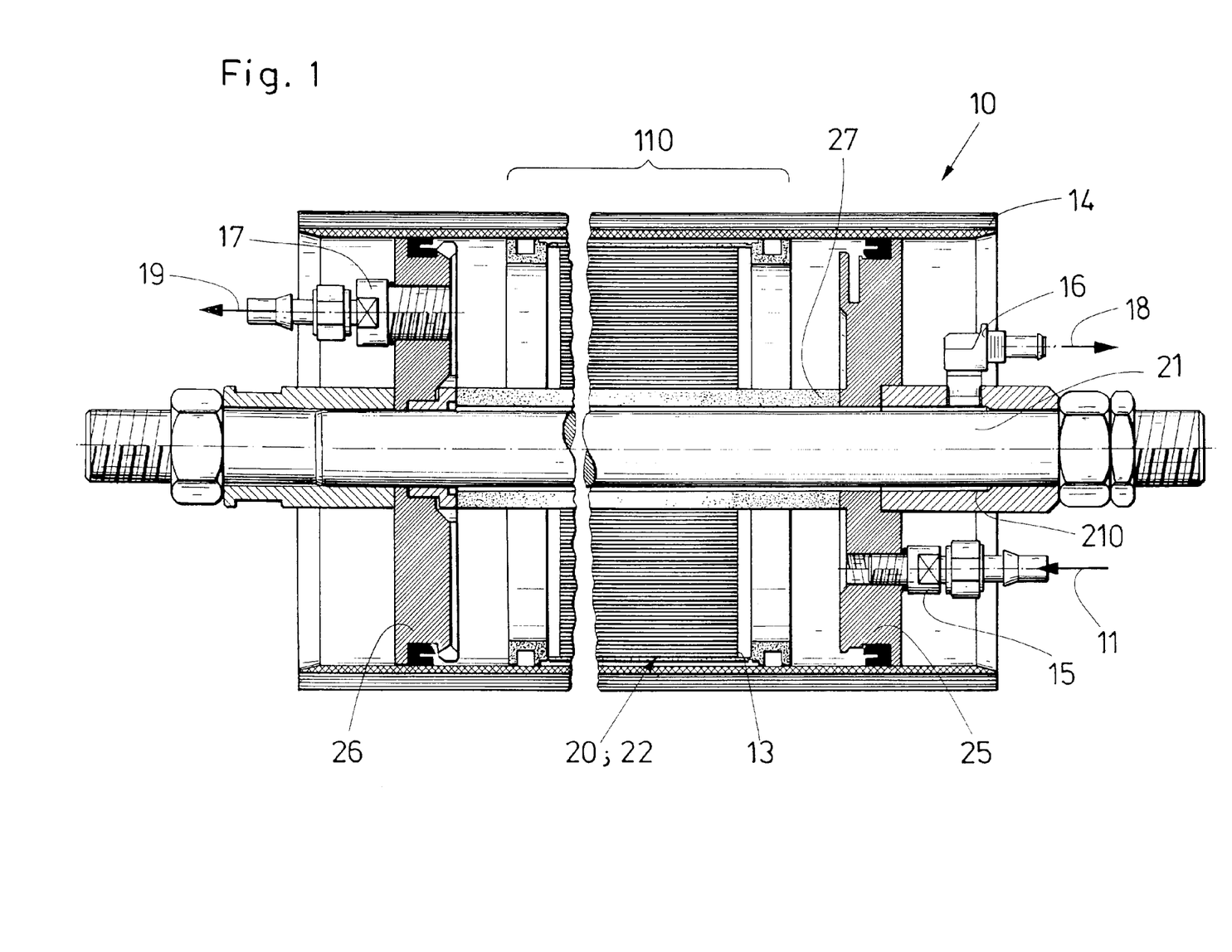
FIG. 1 shows the apparatus according to the invention in an axial cross-sectional view.
Figure 2:
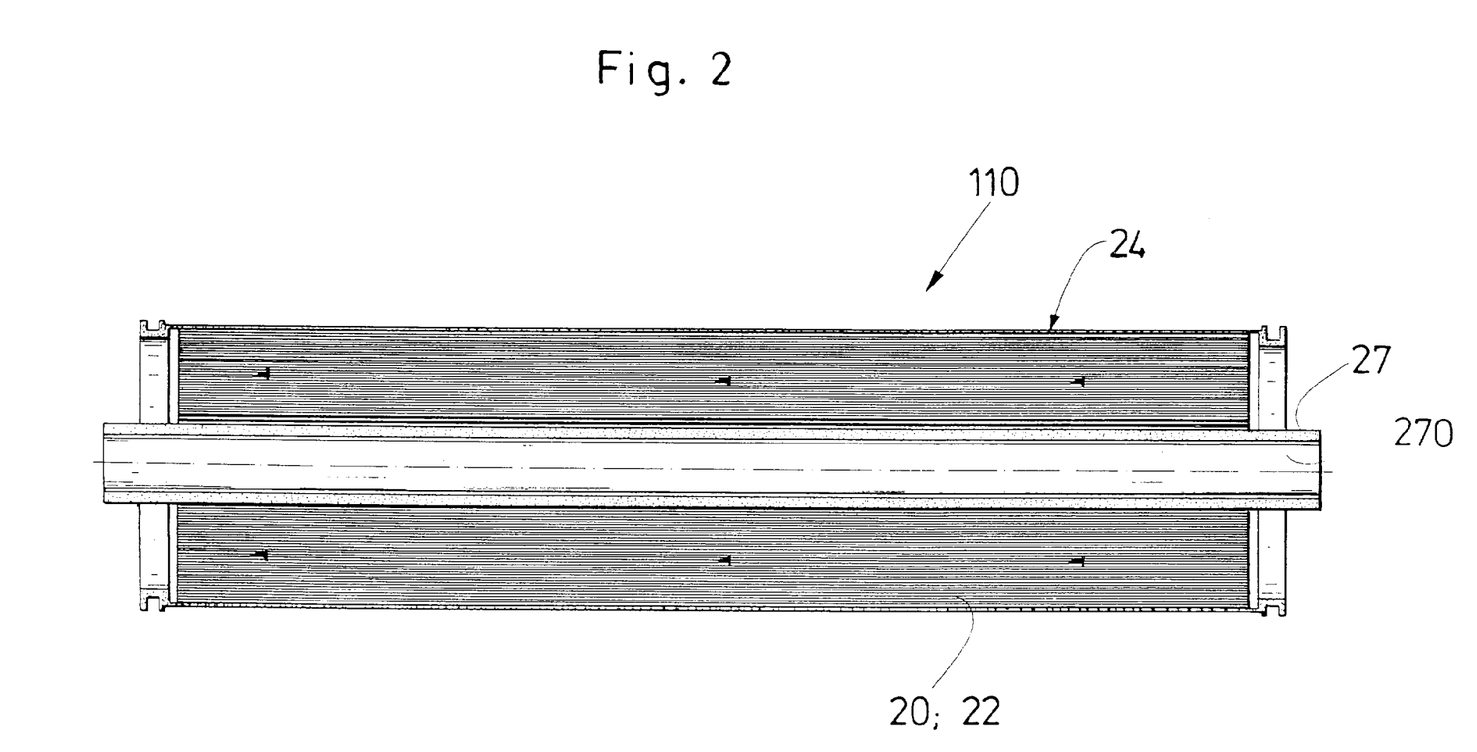
FIG. 2 shows in an axial cross-sectional view the membrane element comprising spirals of pillow membranes and spacer elements wound onto a tube element slipped onto the bolt or tube-like permeate discharge and collection structure which extends through the apparatus.

With regard to the design of the apparatus 10 reference is first made to FIGS. 1 and 2. The apparatus 10 comprises a pressure-tight housing 14, which is shown in the figures as a tubular cylindrical element. Essentially axially in the housing 14, there is a permeate discharge and collection structure 21, which extends through the apparatus 10 and which is also used as a clamping bolt which supports or contains the separation unit 110, as will be explained further below.

A part of the separation unit 110 is shown in FIG. 2. The separation unit 110 however includes, in addition to the permeate discharge and collection structure 21 which extend bolt-like through the apparatus 10, closure elements 25, 26, which are not shown in FIG. 2 for clarity reasons.

The permeate discharge and collection structure 21 is disposed in a separate tube element 27, which can be pulled off the permeate discharge and collection structure 21.

Figure 3:
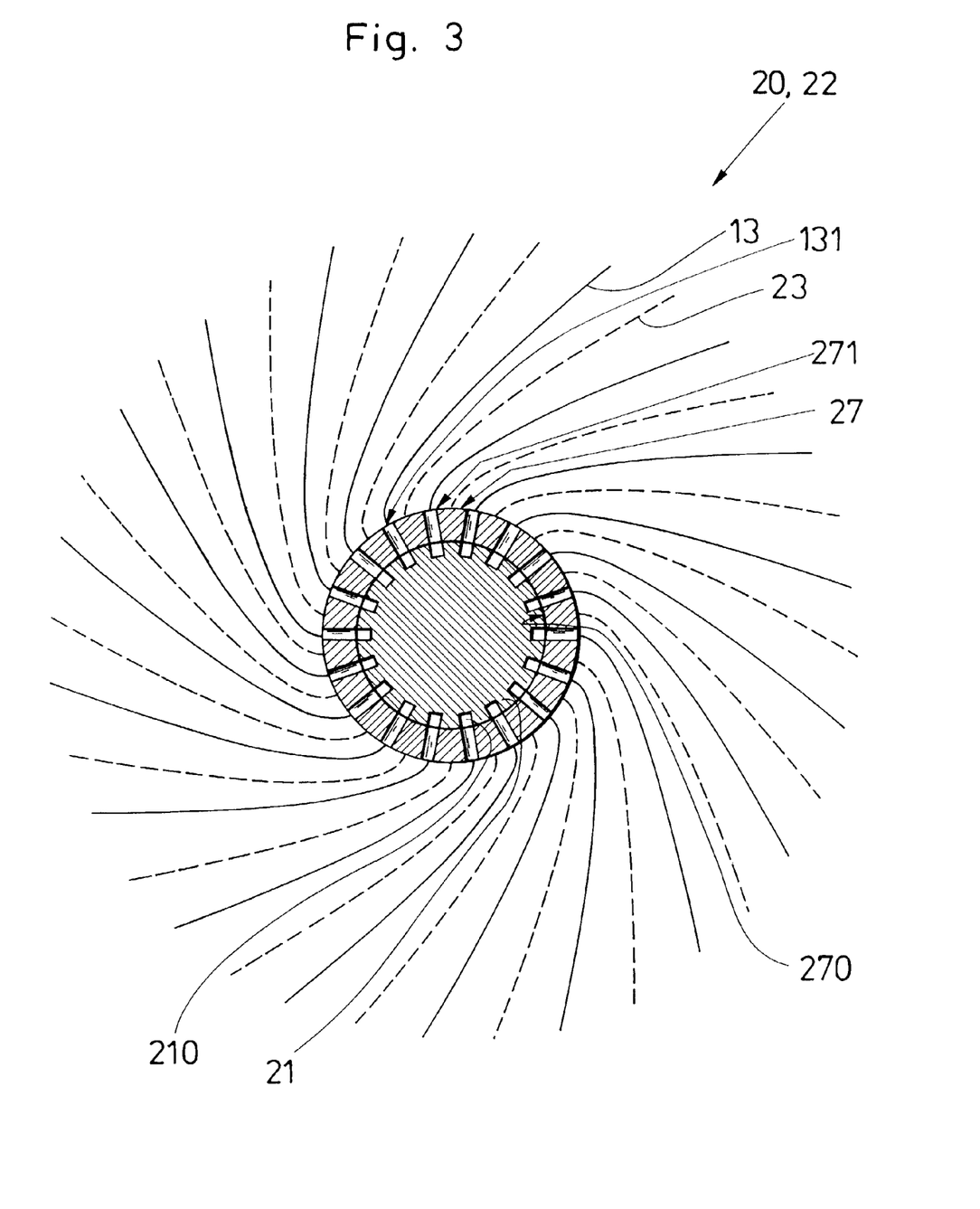
FIG. 3 is a radial cross-sectional view of the membrane element with the permeate discharge and collection structure disposed in the tubular element and the membrane pillows with the spacer elements disposed therebetween not yet wound onto the tubular element for an explanation of the design according to the invention.

Onto the separate tube element 21, which also extends essentially over the full length of the apparatus 10, that is, in its axial length it is only slightly shorter than the housing 14, a plurality of membrane elements in the form of membrane pillows 13 are wound so as to form a multi-element or multi-layer spiral 20, see FIG. 3. In FIGS. 1 and 2, the multi-element spiral 20 is shown in the finished wound-up state. FIG. 3 is a sectional view taken along the line C-D of FIG. 2 however on an enlarged scale and showing—different from FIG. 2—the multi-element spirals 20 of the membrane pillows 13 in a relaxed, that is, not tightly wound state. In FIG. 3, the permeate discharge and collecting structure 21 is shown inserted into the interior opening 270 of the tube element 27. The membrane pillows 13 indicated in FIG. 3 by full lines are not to scale. In an actual embodiment, the membrane pillows have for example a width of 950 mm and a length of 755 mm wherein as the length, the effective length of the membrane pillow 13 in the direction of the tube element 27 is considered. The above width and length dimensions are only exemplary; completely different width and length dimensions may be employed for the membrane pillows 13.

In the embodiment shown in FIG. 13, the multi-element spiral 20 comprises 18 membrane pillows 13. But also herefor, a different number of membranes pillows 13 can be used to form the spiral 20.

It is also pointed out that the representation of FIG. 3 is only schematic for a better understanding of the apparatus 10. Therefore, the individual membrane pillows 13 forming the multi-element spiral 20 are shown in a quasi-spaced relationship.

Figure 5:
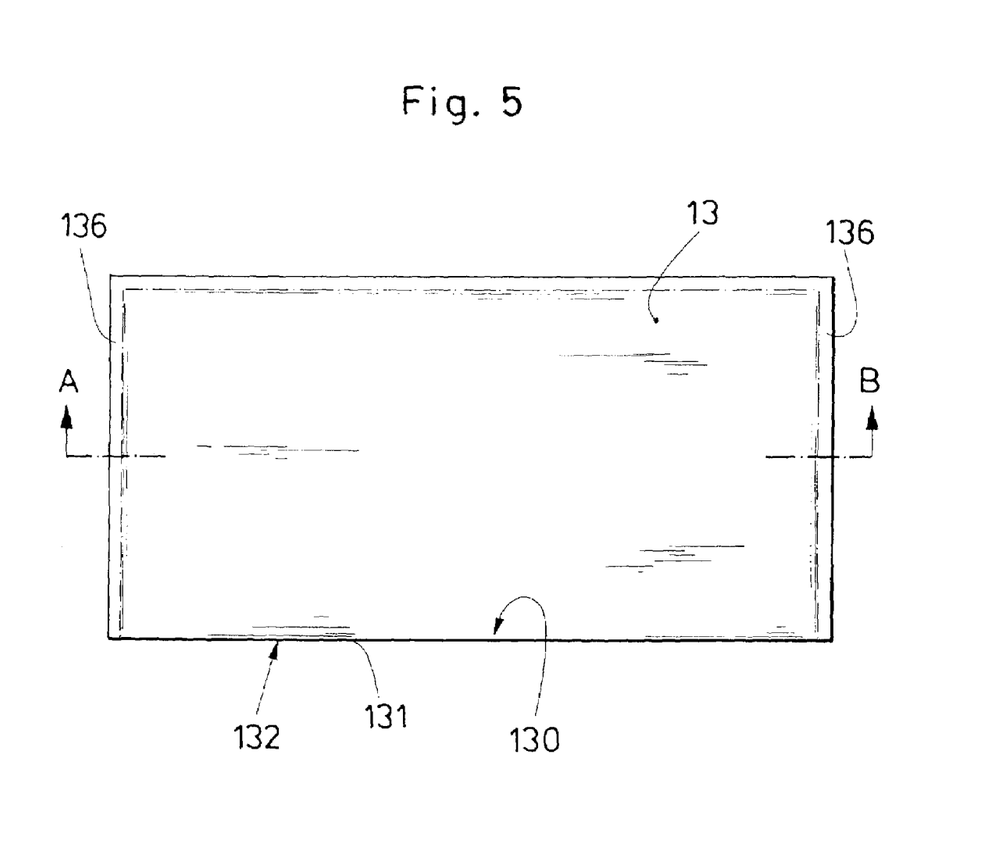
FIG. 5 shows a membrane pillow with a discharge opening arranged at one side thereof.
Figure 6:
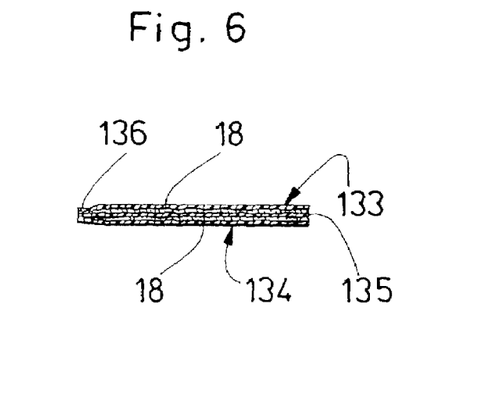
FIG. 6 is a part of a sectional view taken along line A-B of FIG. 5 showing the design of a membrane pillow including a support element.
Figure 7:
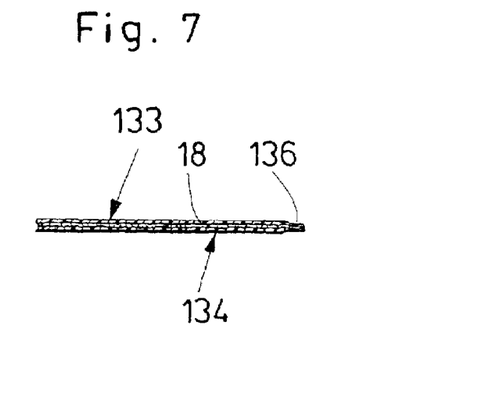
FIG. 7 is a sectional view taken along line A-B of FIG. 5 showing a design of a membrane element without intermediate elements.

The membrane pillows 13 are constructed as shown in FIGS. 5, 6 and 7. This will be explained in greater detail further below. In the final wound-up state of the multi-element spiral 20, the spiral 20 has a shape as shown in the axial cross-sectional view of FIGS. 1 and 2.

The membrane pillows 13 of the multi-element spiral 20 are arranged relative to the tube element 27 such that their permeate discharge openings 131 join the radial passages 271 in the tube element 27, see FIG. 3. The permeate 18 leaving the permeate discharge openings of the membranes 13 flows therefore into the radial passages 271 and through these passages 271 into the permeate inlet openings or passages 210 of the permeate discharge and collection structure 21 which openings 210 extend axially along the permeate discharge and collection structure 21. Through the inlet openings 210, the permeate flows to an annular channel at and end of the permeate discharge and collection structure 21 for discharge by way of a permeate outlet 16.

It is also possible to provide, instead of separate groove-like permeate inlet openings 210, between the interior bore 270 of the tube element 27 and the bolt-like permeate discharge and collection structure 21 extending through the apparatus 10, an annular channel through which the permeate 18 is conducted to the permeate outlet 16.

In the embodiment described herein, eighteen radial passages 271 are provided in the tube element 27 in accordance with the eighteen membrane pillows 13. Along the separate tube element 27, a plurality of radial passages 271 are provided in axial alignment depending on the length of the membrane pillows 13 in order to ensure a uniform discharge of the permeate 18 from the membrane pillows 13.

A second multi-element spiral 22 is formed by the spacer elements 23, which is so arranged that the membrane pillows 13 forming the multi-element spiral 20 are held in spaced relationship by the spacer elements 23. In FIG. 3, the spacer elements 23 are indicated by dashed lines disposed between the membrane pillow 13 shown in fill lines.

Figure 4:
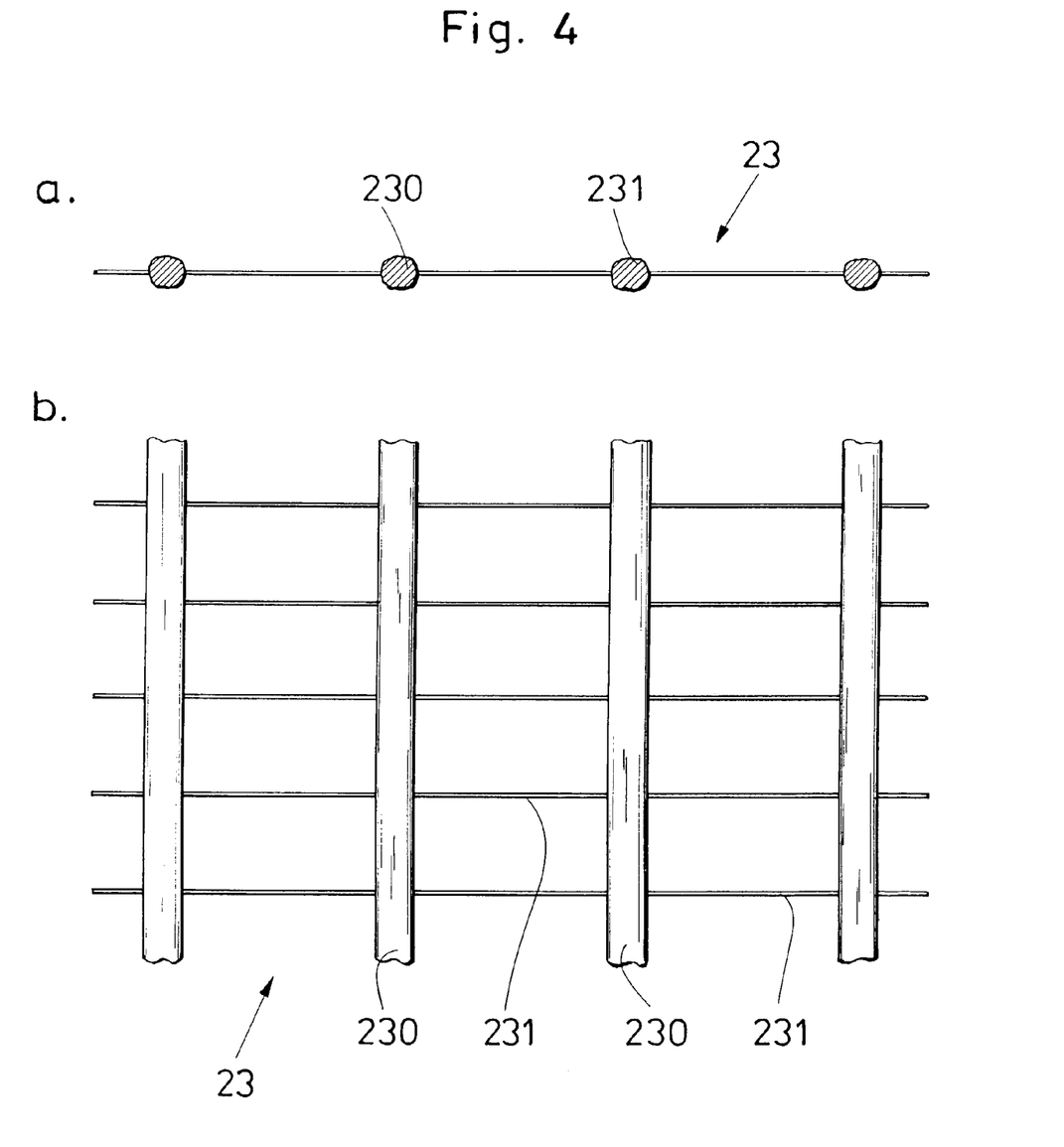
FIG. 4a is a side view of a spacer element in an enlarged scale.
FIG. 4b is a plane view of the spacer element in an enlarged scale.

The spacer elements 23, which have essentially the same length and width as the membrane pillows 13, have a lattice-like structure as shown in FIGS. 4a and 4b. For clarification of the design, the spacer elements 23 are shown in FIGS. 4a and 4b, in an enlarged scale. The lattice-like structure of the spacer elements 23 is formed by a plurality of first and second rod elements 230, 231, which intersect at right angles. The first rod elements 230 have a larger diameter than the second rod elements 231. To provide for the multi-element spiral 22, the spacer elements 23 are arranged in the apparatus 10 relative to the multi-element first spiral of membrane pillows 23 in such a way that the first elements 230 of the spacer elements 23 extend essentially parallel to the tube element 27, that is, parallel to the permeate discharge and collection structure. In this way, the flow medium 11 to be separated flowing through the spiral structure, 20, 21 past the second elements 231 has a negligibly small flow resistance. The first and second rod elements 230, 231 of the spacer elements 23 are in the embodiment shown in FIGS. 4a and 4b essentially round. But other cross-sectional shapes are possible if, for example, turbulence is to be generated in the flow medium 11 to be separated while flowing past the membrane pillows 13 through the multi-element spiral 20. This may be necessary for special applications of the apparatus. The spacer elements 23 consist of an elastic material such as plastic, that is an elastomer resin.

If the multi-element spiral 20 of membrane pillows 13 is wound up to its final shape as shown in FIGS. 1 and 2, the spacer elements 23 disposed between the membrane pillows 13 are in close contact with the surfaces of the respective adjacent membrane elements 133, 134 of the membrane pillows 13 and prevent direct contact between the adjacent membrane pillows 13. In this way, a flow passage is formed so that the flow medium can flow into the multi-element spiral 20 of membrane pillows 13 at one end thereof, see FIG. 12 right end, and, after passing over the membrane pillows 13 can leave the multi-element spiral 20 at the other end (left end in FIG. 1). By providing between the membrane elements of the first spiral 20, the spacer elements of the second spiral 22 a sufficiently large flow cross-section for the flow medium 11 is maintained.

When the first and second multi-element spirals 20 and 23, which, in the given example, would consist of 34 elements, that is, 18 membrane pillows and 18 spacer elements 23, is in the wound-up state as shown in FIGS. 1 and 2, the membrane elements are then disposed on top of one another with the spacer elements 23 disposed therebetween. The spirals 20, 22 are fixed at their outer circumference 24, see FIG. 2. This can be achieved by winding a plurality of string-like elements around the outer circumference 24 of the spirals 20, 22. In order to increase the rigidity of the wound up spiral structure, the string-like elements may be soaked with a curable resin or plastic material. By suitable application of heat or by a suitable control of the curing process of the resin or plastic material, after completion of winding of the string-like elements around the spirals 20, 22, the curing process can be induced. But it is also possible to wind a web of elastomer material around the spirals 20, 22 as it is done with electric coils.

When the body of spirals 20, 22 is completed as shown for example in FIG. 2, the permeate discharge and collection structure 21 is inserted into the apparatus housing 14 so as to extend bolt-like through the apparatus 10. At both ends, this structure of multi-element spirals 20,22 and the tubular element 27 is then provided with closure elements 25, 26, which have at least one inlet 15 and outlet 16 for the medium 11 to be separated and an outlet 17 for the retentate 19. With suitable sealing means and sleeves, the closure elements 25, 26 are sealed with respect to the tubular permeate discharge and collection structure 21. The closure elements 25, 26 include sealing means by which they can be mounted to the housing 14 in a pressure-tight manner, see FIG. 1 after the separating unit 110 consisting of the spirals 20, 22, the permeate discharge and collection structure 20 and the closure elements 25, 26 has been inserted into the housing 19.

The membrane pillows 13 used in the apparatus 10 have an essentially rectangular structure—see FIG. 5.

Membrane pillows 13 of this type are disclosed, for example, in EP-B-0 129 663; they are manufactured in a well-known manner.

The membrane pillows 13 consist generally of two membrane elements 133, 134 usually of a suitable polymer material. The polymers are selected depending on the separation task for which the apparatus 10 is to be used that is depending on the flow medium 11 to be separated. The two membrane elements 133, 134 are joined at their circumferential edges 136 in a known manner (see FIGS. 6, 7) for example, by ultrasonic treatment or by a suitable cement.

The membrane pillow 13 as used in connection with the present invention are provided at one end 132 with a permeate discharge opening 131, which is in axial alignment with a radial passage 271 of the tube element 27 so that the permeate 18 leaving the membrane pillow 13 enters the radial passage 271 of the tube element 27 by way of the permeate discharge opening 131. In the interior of the membrane pillow 13, that is, between the membrane elements 133, 134, there may be at least one intermediate element 133 (see the embodiment of the membrane pillow 13 according to FIG. 6). The intermediate element 135 may be a fleece-like structure through which a permeate flow to the permeate discharge opening 131 is facilitated. However, it is basically possible to omit such an intermediate element 135 from the space between the membrane elements 133, 134, see the embodiment of membrane pillows 13 according to FIG. 7.

What is claimed is:

1. An apparatus (10) for filtering and separating a flow medium (11) by way of membranes (13) into a permeate and a retentate, comprising a pressure-tight housing (14), a membrane structure disposed in said housing (14), an inlet (15) for supplying said flow medium (11) to be separated to said housing (14), and outlets (16, 17) for discharging the retentate and, respectively, the permeate from said housing (14), said membrane structure comprising a central permeate collection and discharge tube (27) supported centrally in said housing (14), a plurality of membrane elements in the form of membrane pillows (13) radially connected to said central permeate collection and discharge tube 27 and extending therefrom in a spiral pattern around said central permeate collection and discharge tube (27), each of said membrane pillows (13) having at one end (130) thereof where it is joined to said permeate collection and discharge tube (27) a permeate outlet opening (131) in communication with a corresponding permeate inlet opening (271) in said permeate collection and discharge tube (27) for the removal from said membrane pillows of the permeate collected in said membrane pillows (13), said permeate collection and discharge tube (27) having axial slots (271) forming said permeate inlet openings and a rod (21) removably disposed in the tube (27) and having axial grooves (210) in alignment with the axial slots (271) in the tube (27) for receiving the permeate from the membrane pillows (13) and conducting it away out of the tube (27).

2. An apparatus according to claim 1, wherein said membrane pillows (13) have a rectangular contour with a front edge provided with said permeate outlet opening (131).

3. An apparatus according to claim 1, wherein said membrane pillows (13) extending from said permeate collection and discharge structure in a spiral pattern and are supported in spaced relationship to permit the flow of said flow medium axially through said apparatus along said membrane pillows (13).

4. An apparatus according to claim 3, wherein said membrane pillows (13) are supported in spaced relationship by spacer elements (23) extending spirally from said permeate collection and discharge structure between said membrane pillows (13).

5. An apparatus according to claim 4, wherein said spacer elements have a lattice-like structure.

6. An apparatus according to claim 5, wherein said lattice-like structure comprises a plurality of rectangularly intersecting first and second rod elements wherein the first rod elements have a larger cross-section than the second rod elements.

7. An apparatus according to claim 6, wherein said first and second rod elements have circular cross-sections.

8. An apparatus according to claim 4, wherein said spacer elements consist of an elastic/elastomer material.

9. An apparatus according to claim 1, wherein an intermediate element is disposed within each membrane pillow for supporting the opposite membranes of the membrane pillow.

10. An apparatus according to claim 9, wherein said intermediate element is of a fleece-like structure.

11. An apparatus according to claim 1, wherein the spiral membrane pillow arrangement is surrounded by a string element for containing the spiral membrane arrangement.

12. An apparatus according to claim 11, wherein the string element is soaked with a curable resin or plastic material which is hardened after being wound around the spiral membrane arrangement.

13. An apparatus according to claim 1, wherein said housing is closed by closure elements disposed at opposite ends of said housing and enclosing the spiral membrane arrangement therebetween in a pressure-tight manner, said closure elements being provided at least with one inlet for supplying the flow medium to the apparatus and with a retentate outlet and a permeate outlet.

14. An apparatus according to claim 13, wherein said permeate collection and discharge structure with said spiral membrane pillows and the closure elements form a separating unit, which is insertable into the housing and removable therefrom.

15. An apparatus according to claim 1, wherein said collection and discharge tube (27) consists of a plastic material.

* * * * *